(12) United States Patent
Bonifer et al.

(10) Patent No.: US 6,957,736 B2
(45) Date of Patent: Oct. 25, 2005

(54) CONVEYOR FOR TRANSPORTING LOAD CARRIERS

(75) Inventors: Edgar Bonifer, Muenster (DE); Mario D'Onofrio, Obertshausen (DE); Alexander Fuchs, Bad Vilbel (DE); Johann Kandziora, Königstein/Ts. (DE); Georg Ketzer, Höhenkirchen-Siegertsbrunn (DE); Matthias Reck, Ober-Ramstadt (DE); Hartwig Reckemeier, Rodgau (DE); Alexander Sauer, Aschaffenburg (DE)

(73) Assignee: Siemens Aktiengesellschaft, (DE)

( * ) Notice: Subject to any disclaimer, the term of this patent is extended or adjusted under 35 U.S.C. 154(b) by 0 days.

(21) Appl. No.: 10/827,175

(22) Filed: Apr. 19, 2004

(65) Prior Publication Data

US 2004/0211649 A1    Oct. 28, 2004

(30) Foreign Application Priority Data

Apr. 24, 2003 (DE) ................. 103 18 621

(51) Int. Cl.$^7$ ........................................... B65G 15/10
(52) U.S. Cl. ..................................... 198/817; 198/583
(58) Field of Search .......................... 198/817, 860.2, 198/860.1, 812, 804, 583, 584; 414/140.2, 414/799, 528

(56) References Cited

U.S. PATENT DOCUMENTS

| | | | | |
|---|---|---|---|---|
| 3,666,085 A | * | 5/1972 | Folkes ........................ 198/847 |
| 3,870,140 A | * | 3/1975 | Wieser ........................ 198/817 |
| 3,934,707 A | * | 1/1976 | Bowman .................. 198/460.1 |
| 3,952,861 A | * | 4/1976 | Holmqvist et al. ......... 198/816 |
| 4,930,623 A | * | 6/1990 | Johnson et al. .......... 198/465.1 |
| 4,993,542 A | * | 2/1991 | Nomura ...................... 198/816 |
| 5,058,727 A | * | 10/1991 | Jahns et al. .............. 198/460.1 |
| 5,174,435 A | * | 12/1992 | Dorner et al. .............. 198/806 |
| 5,813,518 A | * | 9/1998 | Kirker ........................ 198/817 |
| 6,176,367 B1 | * | 1/2001 | Patrito ........................ 198/817 |
| 6,234,303 B1 | * | 5/2001 | Gales et al. ................ 198/817 |
| 6,644,463 B2 | * | 11/2003 | Mott ........................... 198/496 |

FOREIGN PATENT DOCUMENTS

| | | |
|---|---|---|
| DE | 196 16 907 C2 | 10/1997 |
| DE | 197 34 413 C1 | 1/1999 |
| DE | 100 32 189 A1 | 1/2002 |

* cited by examiner

Primary Examiner—Richard Ridley
(74) Attorney, Agent, or Firm—Van Dyke, Gardner, Linn & Burkhart, LLP

(57) ABSTRACT

A conveyor for transporting load carriers, having load-bearing members which are spaced apart parallel to one another on frame parts and are intended for accommodating drivable load-bearing elements which form longitudinally running load-bearing tracks for the load carriers resting on the load-bearing elements. The conveyor may include modular-construction conveying units, and each load-bearing element of at least two laterally spaced-apart load-bearing members of each conveyor unit may comprise an endlessly circulating load-bearing belt, which bears the load carriers and which is supported on load-bearing rollers mounted on the load-bearing members. The conveyor may be provided for transporting load carriers and may be suitable for conveying the load carriers both longitudinally and transversely. The conveyor may transport the load carriers with a lower level of noise, and may allow a high throughput even of large loads. The conveyor may be used cost-effectively both for production and for installation on site.

41 Claims, 8 Drawing Sheets

FIG 5
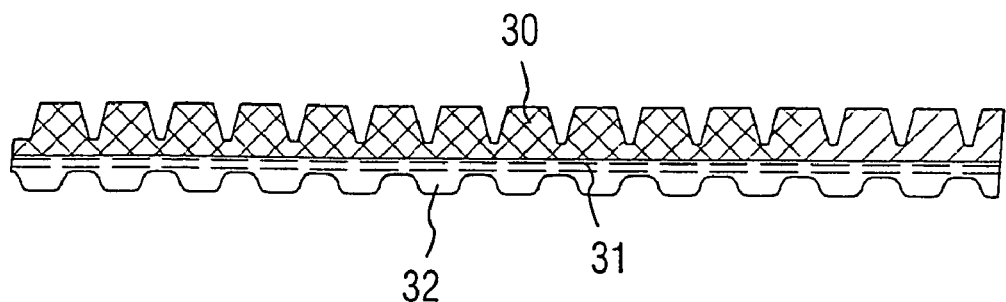
FIG 6
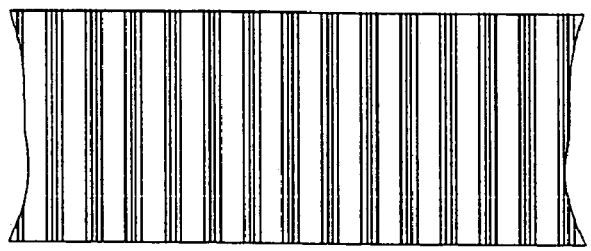
FIG 7
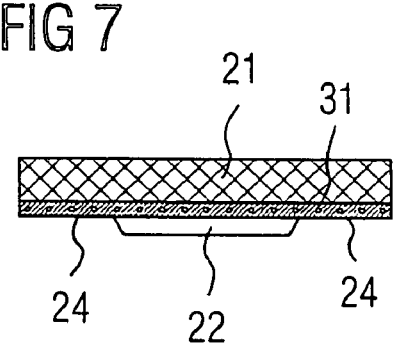
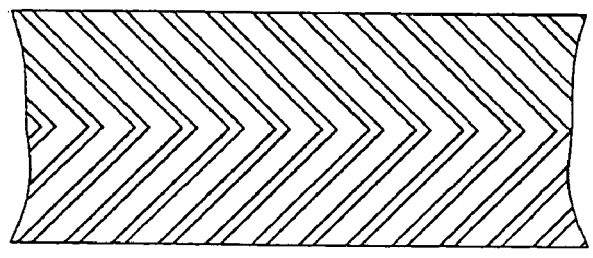
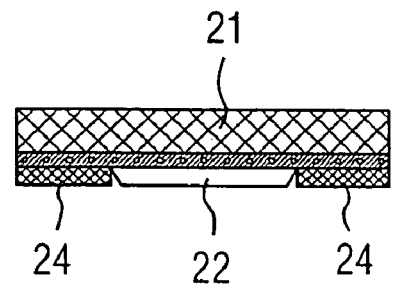
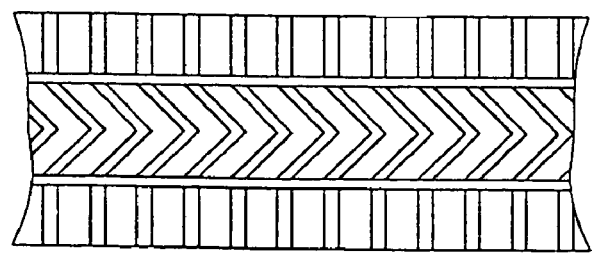
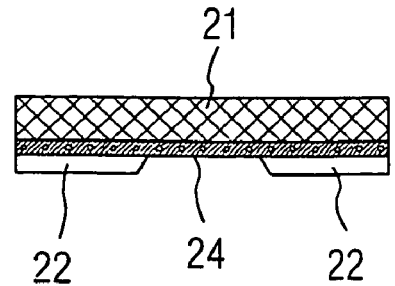

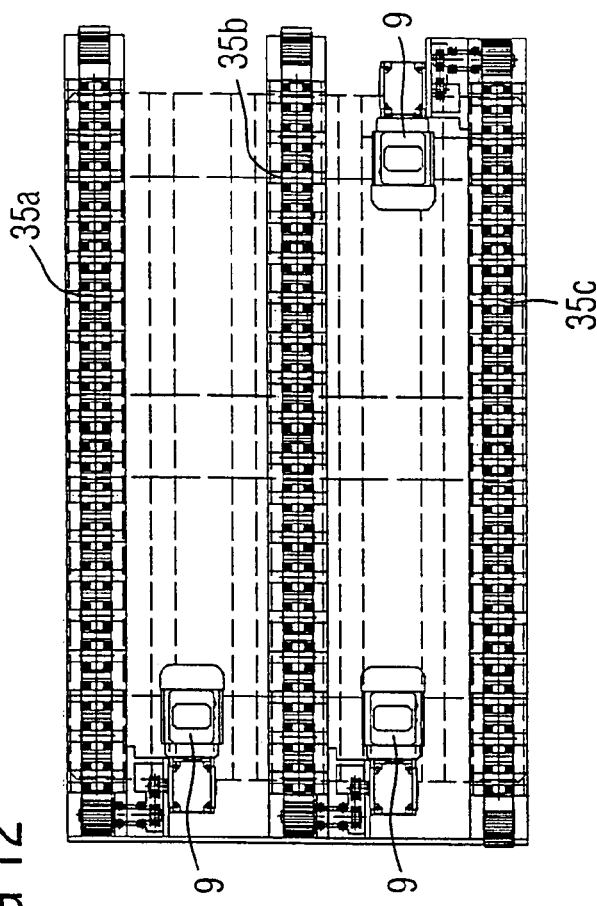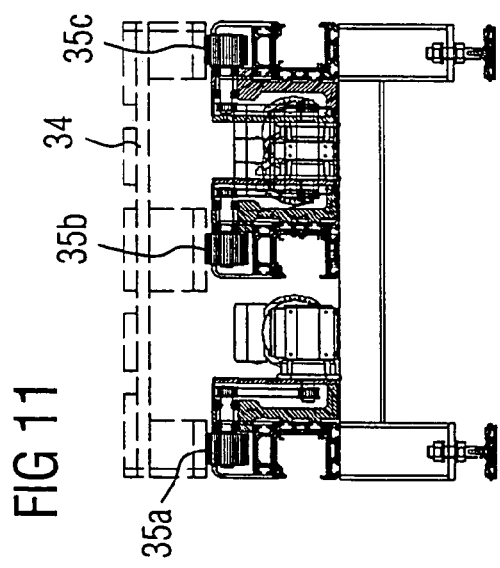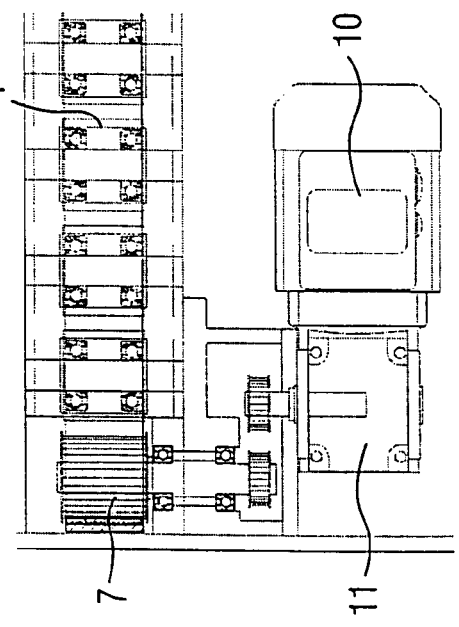

CONVEYOR FOR TRANSPORTING LOAD CARRIERS

FIELD OF THE INVENTION

The present invention relates to a conveyor for transporting load carriers, in particular standardized pallets, skids or containers.

BACKGROUND OF THE INVENTION

Known conveyors for transporting load carriers operate as roller conveyors or chain conveyors, depending on the type of load carriers which are to be transported. In the case of pallet conveyors, use is made predominantly of roller conveyors, in particular if the pallets are transported in their longitudinal direction. If the pallets are transported in the transverse direction, chain conveyors are usually used. Both conveying principles have disadvantages both for the manufacturer and for the operator of the installations.

Since the manufacturer often has to provide for both the conveying principles, that is to say for conveying in the longitudinal and transverse directions, in conjunction with a multiplicity of drive variants for which provision has to be made, the installations may become very expensive. As a result of the large spacing between rollers in roller conveyors, the pallets are subjected to pronounced loading and, over the long term, they become pliable since the nails which hold the pallet parts together loosen as the pallet runs over the rollers.

The conveyors, in particular the chain conveyors, make a lot of noise. Moreover, for drive purposes, chain conveyors require high levels of motor power since the chains are borne with friction. In addition, the chains may have to be constantly oiled, and this contaminates the pallets, for which reason the use of chain conveyors is not permitted in many branches of industry (e.g. the automotive sector). Furthermore, the articles conveyed are also subjected to pronounced loading as they are transported. It is also the case with chain conveyors that it is necessary to provide a large number of drive and transmission variants, which ultimately has an adverse effect on the price and the cost-effectiveness. Nevertheless, at present, roller conveyors are used predominantly for conveying pallets longitudinally, while the chain conveyors are reserved predominantly for conveying the pallets transversely.

SUMMARY OF THE INVENTION

An object of the present invention is to provide a novel conveyor for transporting load carriers, in particular standardized pallets, skids or containers, which does not have the above described disadvantages, which is suitable for conveying the load carriers both longitudinally and transversely, which, while transporting with a low level of noise, allows a high throughput even of large loads, and which can be used, in particular, cost-effectively both for production and for installation on site.

In order to achieve this, it is proposed according to the present invention that the conveyor is made up of modular-construction conveying units, and each load-bearing element of at least two laterally spaced-apart load-bearing members of each conveying unit comprises an endlessly circulating load-bearing belt, which bears the load carriers and, for its part, is supported on load-bearing rollers which are mounted on the load-bearing members, with a small distance between their centers, and circulate in the conveying direction.

A basic idea of the conveyor according to the invention is thus to make up the conveyor in modular fashion from modular-construction conveyor units and to bear the load carriers on at least two load-bearing tracks both comprising load-bearing belts which, for their part, are borne on load-bearing rollers. The load-bearing belt, which is borne on load-bearing rollers, replaces the disadvantageous chains and the rollers which subject the load carriers to wear, and on which the load carriers were hitherto borne directly, and thus provides a load-bearing element which is not just silent, but can also advantageously be used universally for conveying the load carrier both transversely and longitudinally. The spacings between the load-bearing rollers should preferably be smaller than the smallest foot width of the load carrier.

Contamination such as that which was unavoidable in conjunction with conveying on chains does not occur in the case of the solution according to the invention, and the load carriers are transported very carefully without the articles transported being subjected to disadvantageous loading. The modular construction of the conveyors and of the conveying units allows very cost-effective production by way of pre-assembly of the conveying units, which can be put together to form the conveyor on site. The merely small number of universally usable components reduces the storage costs and renders the maintenance and repair work less expensive.

In a preferable configuration of the invention, it is provided that the load-bearing belts are designed as toothed belts, of which the teeth arranged on the underside, for the purpose of transmitting the driving torque, engage in the correspondingly designed teeth of at least one driving gearwheel. The toothed belt is particularly well-suited as a load-bearing belt of a conveyor unit according to the invention because, using the same, it is possible for the load-bearing belt to be subjected to the tensile force which is necessary in order also to transport heavy load carriers. At least one driving wheel is sufficient in order, with corresponding motor power, to move heavy load carriers on the two load-bearing tracks of the conveyor unit.

According to the invention, the load-bearing members can be formed straightforwardly and inexpensively from a rolled steel profile or angled sheet metal, a continuous, torsionally rigid profile preferably being formed in this way. If, however, according to a further feature of the invention, it is provided that the load-bearing members of the modular-construction conveying unit are formed from an extruded aluminum profile, this gives a particularly stable and functional solution which has advantages, which will be described in detail at a later stage in the text, which more than compensate for the greater production costs in relation to sheet-metal load-bearing members. Furthermore, it is possible nowadays to form extruded aluminum profiles as desired, the degree of freedom for shaping the profiles being greater than is possible in the case of angled metal plates. In contrast to angled sheet-metal profiles, it is also possible for the extruded aluminum profiles to be used without a coating, because the surface of the aluminum profile is of attractive appearance without any follow-up treatment.

According to a feature of the present invention which is worthy of particular emphasis, it is provided that each load-bearing member is made up of a load-bearing profile and of a bar, which is positioned in an exchangeable manner on the load-bearing profile and in which the load-bearing rollers for the load-bearing belt are mounted.

The load-bearing member is divided up into two components, of which one, the load-bearing profile, performs the load-bearing function of a frame part, and the other, the bar, performs the function of the load-bearing element for the load carrier, the components provided for bearing the load carrier (load-bearing rollers and load-bearing belt) being assigned the exchangeable bar, which can be positioned on, and easily removed again from, the load-bearing profile. This makes it possible, if required, for different load-bearing elements to be positioned on one and the same universally configured load-bearing member and for damaged load-bearing elements to be exchanged easily and quickly and for worn or damaged load-bearing belts to be changed without difficulty. This modular principle which is used significantly increases the freedom in putting together different conveying units, so that individual customer requirements can be satisfied very easily and cost-effectively because different conveying units can be provided just by joining together different load-bearing elements with one and the same load-bearing profile. The different widths of the conveyors can be achieved by frame parts which are available in modular form, and this reduces the number of components used overall, which significantly reduces the storage costs and the production costs, up to and including the assembly and installation costs.

In one configuration, it is provided that the load-bearing profile is open at least on one of its longitudinal sides. Such a profile has sufficient load-bearing capability for the desired purpose and has further advantages, which will be described in more detail at a later stage in this text.

It is particularly advantageous if, according to one feature of the invention, the load-bearing profile of each load-bearing member is cross-sectionally C-shaped and the bar, which can be positioned on the load-bearing profile, is of cross-sectionally U-shaped design, the load-bearing rollers for the load-bearing belt being mounted in the legs of the U-profile of the bar. The U-profile is particularly well-suited for creating a "roller bar" since the legs can be used for mounting the rollers, while the base side of the U-profile serves for fastening the bar on the load-bearing profile.

However, it is also conceivable according to the invention, as it were, for the load-bearing profile of each load-bearing member to be of cross-sectionally C-shaped design, and to fasten on the load-bearing profile two vertical metal plates which are spaced apart parallel to one another in the longitudinal direction and between which the load-bearing rollers for the load-bearing belt are mounted.

A solution of the invention which is particularly advantageous, and preferable, in design terms provides that, if use is made of a U-shaped bar, the latter can be positioned on the load-bearing profile, and screwed to the latter, with the opening in the downward direction, and the load-bearing rollers can have their running surfaces for the load-bearing belt projecting upward through cutouts provided in the bar.

This system is particularly stable and functional, the end sides of the legs of the U-shaped bar can rest on corresponding supporting surfaces of the load-bearing profile, and the cutouts in the base of the U-profile, which is installed upside down, make it possible for the load-bearing rollers to bear the belt on that region of the load-bearing rollers which projects out of the cutouts; at the same time, however, the regions of the U-profile alongside the cutouts close the bar and thus protect the region between the load-bearing rollers from being interfered with in an unintended manner or prevents anything from falling into this region. The legs of the U-shaped bar, which are seated on the load-bearing profile, can easily be fastened on the load-bearing profile by screws and thus, conversely, are very easy to release.

Furthermore, the load-bearing profile, in particular if it is produced from the extruded aluminum profile, makes it possible to provide T-grooves which run in the longitudinal direction of each load-bearing member and are provided for fastening frame parts, drive parts, initiators, control means, and/or the U-shaped bar. These T-grooves can be used on a very individual basis and allow the components to be secured straightforwardly and reliably in relation to the load-bearing profile using conventional fastening elements such as hammer head screws or the like.

It is a quite particular advantage of the invention that in each case at last two load-bearing members can be joined together with the frame parts and supporting feet to form one of a number of autonomous conveying units of the same construction, in which are integrated in each case at least one drive and control elements for the load-bearing elements of this one conveying unit, it being possible for these to be linked in control terms to further drives and control means of this or adjacent conveying units.

It is thus possible according to the invention to synchronize the accelerating and braking processes between preceding and following conveyor units. There is thus no need for the accelerating and braking distance to be contained within a conveyor length, as a result of which very short conveyor units are possible.

An advantage of the solution according to the invention thus resides in the provision of autonomous conveying units of the same construction which, by virtue of being modular, are easy and inexpensive to produce in a prefabricated state and which, fully fitted with dedicated drives, can be operated autonomously. By putting together a number of these conveying units, it is possible to produce a conveyor which, in comparison with conventional conveyors, drastically reduces the process costs in respect of production and application. In particular the assembly and installation costs, but also the transporting costs, can be significantly reduced by a "modular" conveyor according to the invention; the modular construction system allows more or less unlimited variability in producing installations.

In a further configuration of the invention, it is provided that, in order to form three load-bearing tracks, each conveyor unit contains three parallel load-bearing members with load-bearing elements, of which at least the two outer load-bearing elements have the load-bearing belts according to the invention supported on load-bearing rollers. A conveyor with conveyor units configured in this way could solve the problem which can occur, for example in the case of pallets loaded with heavy articles, if these pallets rest merely on two load-bearing tracks in the outer-edge region of the pallets. This is because it is then possible for the pallet to bow and rupture as a result of the load. The central track of the three load-bearing tracks can provide additional support for the pallets, it being possible for the central load-bearing track to be configured, and possibly driven, in the same way as the outer load-bearing tracks, although it is also conceivable to allow this track to run along without a dedicated drive.

As an alternative, it is also conceivable within the context of the invention that, of three load-bearing tracks, only the load-bearing elements of the central load-bearing track can be driven.

It is particularly advantageous if at least one of the C-shaped load-bearing profiles of the load-bearing members is installed on the frame parts with the opening in the outer direction, and the cavity within the C-shaped load-bearing profile, it being possible for this cavity to be closed by a covering plate, is configured as a cable duct and/or for accommodating electrical or electronic components.

This demonstrates the particular advantage of the C-shaped load-bearing profile, of which the inner cavity can be utilized for internal fittings, the load-bearing profile nevertheless being sufficiently stable. This cavity is easily accessible at all times, which is very important for repair and maintenance work. The cavity can be closed in the outer direction by a covering plate, which may be of colored configuration and possibly provided with a company logo or advertising.

The invention can be used particularly cost-effectively if each autonomous conveyor unit, in respect of its length and width measurements, is slightly larger than the dimensions of an individual load carrier which is to be transported. This means that the conveying units are of very short and compact construction, which, on the one hand, facilitates transportation and assembly and installation and, on the other hand, increases the flexibility when a conveyor is put together.

As has already been explained, the conveying units are configured autonomously with dedicated drives. According to the invention, the drive for a load-bearing element comprises a prefabricated drive station which can be screwed to the load-bearing profile in the end region and has an integrated motor, gear mechanism and drive chain or belt and a driving gearwheel, which is mounted in a floating manner, around which the load-bearing belt is deflected, and the top of which is arranged in the load-bearing plane of the load-bearing rollers.

The drive station, as well as the other components of the modular conveyor unit, can be easily and straightforwardly flanged to the load-bearing profile and fastened by screws, preferably in the T-grooves provided there. It is also possible for the drive station to be provided in prefabricated form, which, in the case of maintenance and damage, allows easy exchange and access. The driving gearwheel, which is mounted in a floating manner, makes it possible for the load-bearing belt to be removed without the driving gearwheel having to be removed. In this case, the load-bearing belt is removed in the direction of that side of the conveyor unit which is directed away from the drive station. The driving gearwheel is arranged such that it serves, at the same time, as a load-bearing roller for the load-bearing belt; it forms a conveying plane with the other load-bearing rollers of the load-bearing-roller bar.

According to another feature of the invention, however, it is also possible for the motor and the gear mechanism to be flanged directly to the driving gearwheel, which is mounted in a floating manner.

Should it be necessary, for force-transmission reasons, for the driving gearwheel to be designed with a diameter which is much larger than that of the load-bearing rollers of the load-bearing bar, a further feature of the invention provides that a smaller-diameter guard roller is arranged between the driving gearwheel and the directly adjacent load-bearing roller and/or the driving or deflecting roller of the adjacent conveyor unit. This guard roller prevents the load-bearing belt from penetrating into the relatively large gap between the driving gearwheel and the adjacent load-bearing roller.

The tensioning of the load-bearing belt between the driving gearwheel and the deflecting wheel provided at the opposite end can be achieved very straightforwardly by relative displacement between the bar and the driving gearwheel. In the simplest case, the bar, with the load-bearing rollers mounted therein, is released in its fastening region (in the T-groove) and, with the driving gearwheel fixed in position, is displaced longitudinally on the load-bearing member away from said driving gearwheel. As soon as the load-bearing belt is tensioned, the bar is screwed to the load-bearing profiles again. Fastening the bar by hammer head screws in the T-grooves is particularly suitable for this operation.

As an alternative, however, it is also possible for the load-bearing belt to be tensioned by a tensioning roller provided in the bottom strand.

It is preferable for each load-bearing element to be assigned a dedicated drive station with motor, and for the motors of all the drive stations of a conveyor unit to be synchronized with one another via an electronic shaft. This solution makes it possible to use very straightforward, inexpensive and lightweight motors, because each of these motors only has to drive one load-bearing track of a conveyor unit. The electric shaft makes it possible to synchronize all the load-bearing tracks, with the result that skewing or tilting of the load carrier is avoided.

If, according to the invention, at least two load-bearing elements of a conveyor unit are each assigned a dedicated drive station with motor, and the drive stations can be activated differently in order to achieve differential speeds for the load-bearing elements, then it is also possible for undesirable skewing of the load carriers to be corrected by one load-bearing track being driven briefly at a higher or lower speed than the others. This corresponds to the principle of steering a tracked vehicle.

In order to simplify matters, however, it is also conceivable for at least two load-bearing elements of a conveyor unit to be driven via a common motor, and for the driving wheels of the load-bearing elements to be connected to one another via a mechanical shaft. The motor which is to be used then has to be correspondingly more powerful than the individual motors; this solution may be advantageous for certain applications.

The load-bearing belt, which is designed as a toothed belt, also has on its underside, alongside regions which are toothed in order to drive the load-bearing belt, smooth regions which rest on the load-bearing rollers in order to bear the load resting on the load-bearing belt. It is thus possible, on the one hand, to transmit the high drive power via the toothed region and, on the other hand, to ensure that even high loads can be supported on the load-bearing rollers via the load-bearing belt. The toothed regions may be configured both as standard toothing formations and as special toothing formations in which the tooth widths are larger than the tooth gaps.

In accordance with the proposal of the invention, it is conceivable for the toothed regions of the load-bearing belt, which is designed as a toothed belt, to be accommodated in circumferentially running grooves of the driving wheels and/or load-bearing rollers. It is thus possible, for example, for a central toothed region to be guided in grooves of the low-bearing rollers, whereas the equally sized lateral regions are borne directly on the load-bearing rollers. The driving gearwheel engages directly in the toothed regions of the load-bearing belts.

In order for it to be possible for the, in part, very high tensile forces which are necessary to be introduced into the load-bearing belts, the latter are provided, according to another feature of the invention, with reinforcements which increase the tensile strength. Such reinforcements may consist, for example, of embedded steel wires, Kevlar cables or woven fabrics made of such materials or other strong materials.

In order to prevent the load carriers from slipping on the load-bearing belt, a further feature of the invention makes provision for the load-bearing belt to be provided with a traction-increasing top side. This may be a profile, provided on the top side of the load-bearing belt, in the manner of a vehicle tire, in which case the profile must not hinder the capability of the load-bearing belt deflecting around the deflecting or driving rollers.

Advantageously, the profile is to be configured such that traction is as high as possible in the longitudinal direction of the load-bearing belt and as low as possible in the transverse direction. The reason for this is the occasional need to ensure that the load carrier is carried along in the transporting direction in all conditions but, at the same time, to make it possible for skewing load carriers to be straightened up manually or mechanically on the load-bearing belt by the action of transverse forces.

According to advantageous features of the invention, it is proposed for the toothing formation of the load-bearing belt on the underside of the latter to be designed to be arrow-shaped, half-moon-shaped or interrupted or rectilinear throughout, because this type of toothing formation allows the belt to be borne in a disruption-free manner even on smooth load-bearing rollers. The profiled surface may wear, like the profile of a vehicle tire, that is to say the load-bearing belt is exchanged when it is worn.

It is additionally possible, according to a further feature of the invention, for the load-bearing rollers and/or the driving gearwheels to be designed with flanged wheels for guiding the load-bearing belt and/or the load carrier. With use in conjunction with the present invention, these flanged wheels both make it possible for the load-bearing belt to run straight ahead and, if appropriate, ensure that pallets or other load carriers do not skew on the conveyor. The driving gearwheels may be of convex, trapezoidal or convex-cylindrical design, in order to ensure an advantageous running performance of the load-bearing belt.

It is regarded as being particularly advantageous in conjunction with the present invention that it is possible for the modular-construction conveyor units, completely preassembled and subjected to final testing, to be put together to form the desired conveyor at the use location. The amount of assembly, installation and set-up time which is thus saved, in conjunction with the simplified modular structural elements, constitutes a significant cost saving, which is not cancelled out even by the use of relatively expensive components.

Constructing the conveyor unit from modular components, in particular the bars, in which the load-bearing rollers for the load-bearing belt are mounted, and the load-bearing profiles, which are screwed to the frame parts, also makes it possible in a very advantageous manner, for these parts to be shortened as desired in accordance with the unit spacing of the load-bearing rollers. It is thus possible, if required, to produce conveyor units of dimensions which are shorter than those of the standard components. In this way, it is possible, for example, for the final conveyor unit of a conveyor which is put together from a number of these conveyor units to be shortened, if this is rendered necessary by the space conditions. In this case, the bars and the load-bearing profiles would simply be sawn off; the fastenings on the frame parts are not affected because these are provided anyway on the profiles, for example in the form of the T-grooves.

The operation of assembling the conveyor units to form the conveyor is extremely straightforward because, according to the invention, the load-bearing members of the conveyor units can be connected to one another at their mutually facing ends via metal plates with fastening bores provided at unit spacings. The metal plates are cut out at the C-shaped openings of the load-bearing members, in order that the cable ducts formed in the cutouts are not interrupted. The unit spacing of the bores allows the width of the metal plates to be varied.

Overall, the invention provides a novel conveyor for transporting load carriers which, on account of its modular construction and of the platform concept, has significant advantages in relation to the prior art. For example, the invention makes it possible to realize a universal conveying principle for conveying in the longitudinal and transverse directions. Electronics and cable guides are integrated in the conveyor units, and a number of conveyor units can easily be connected by plug-in connections of a BUS system. The autonomous conveyors can be linked to one another via a control means, this resulting in an intelligent conveyor being produced. Just a small number of components allow variants to be formed straightforwardly. All the drives of the conveyor units are identical, which reduces the acquisition and storage costs and facilitates repair and maintenance. In respect of the production and application of the conveyor, it is possible for the process costs to be drastically reduced; the production throughput times of the conveyor units are very short. The conveyor itself is very silent in relation to known conveyors; it nevertheless has a high level of traction, so that, with higher loading per meter of conveyor, it is possible to achieve a higher throughput. The relatively short units can be put together by electronic coupling to form a conveyor of any desired length.

These and other objects, advantages, purposes and features of the present invention will become apparent upon review of the following specification in conjunction with the drawings.

BRIEF DESCRIPTION OF THE DRAWINGS

An exemplary embodiment of the invention is described hereinbelow and features in the drawing, in which:

FIG. 5 shows a longitudinal section through part of a load-bearing belt;

FIG. 6 shows plan views of the load-bearing sides of parts of differently designed load-bearing belts;

FIG. 7 shows cross sections through differently designed toothing formations of the load-bearing belt;

FIG. 11 shows a cross section through a conveyor unit according to the invention in the region of the drive stations;

FIG. 12 shows a plan view of the conveyor unit according to FIG. 11;

FIG. 13 shows an enlarged illustration of the drive station of a conveyor unit;

DESCRIPTION OF THE PREFERRED EMBODIMENTS

Figure 1:
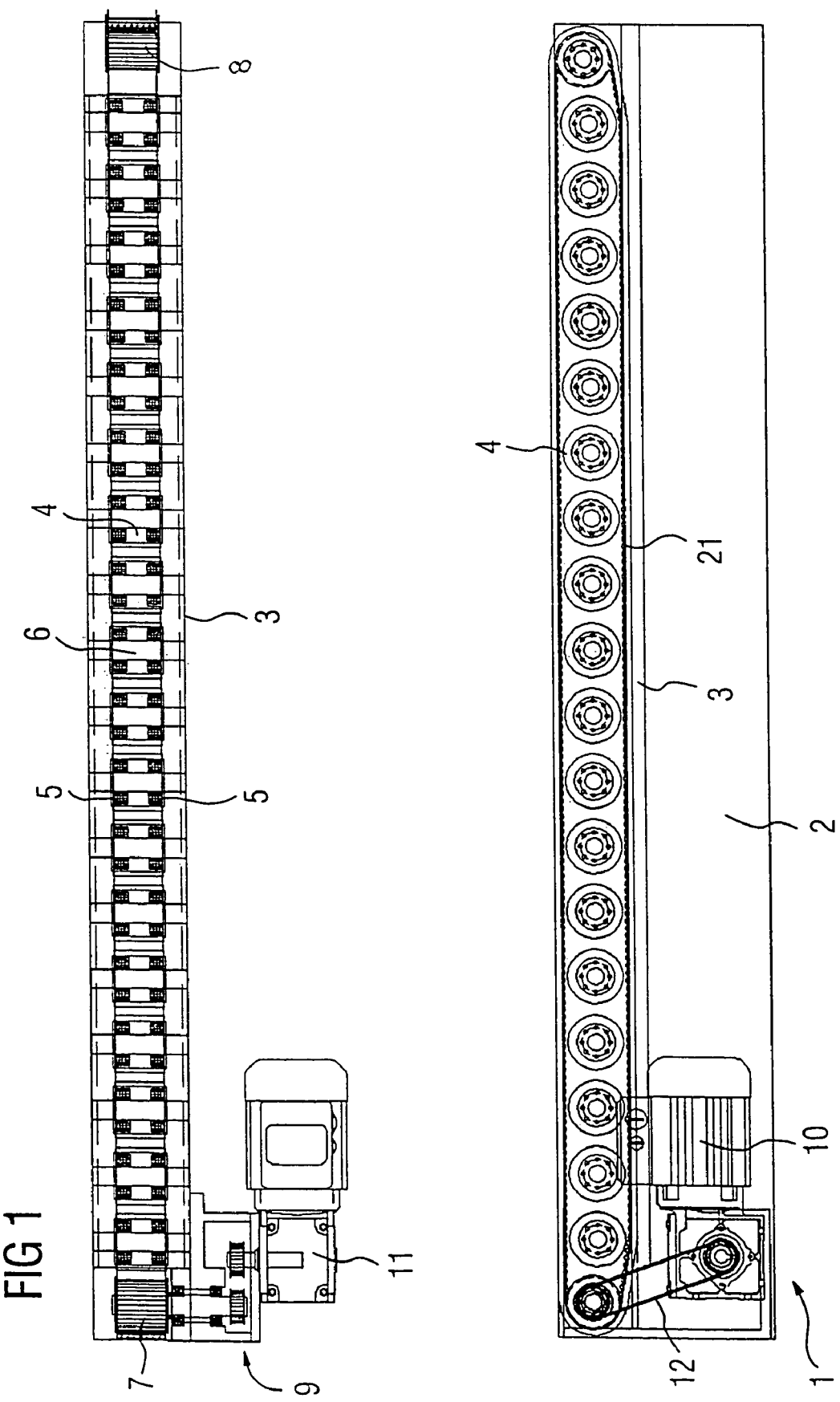
FIG. 1 shows the side view and plan view of the load-bearing element of a modular-construction conveyor unit.

FIG. 1 illustrates a load-bearing element on its own in a side view (at the bottom) and plan view (at the top), this load-bearing element being designated 1 overall and belonging to a conveyor unit according to the invention. The figure shows a load-bearing profile 2 of the load-bearing member of a conveying unit, of which at least two laterally spaced-apart load-bearing profiles 2 belong to a conveying unit. The bar 3 is positioned in an exchangeable manner on the load-bearing profile 2, this bar being connected to the load-bearing profile 2 (in a manner which is not illustrated here). The load-bearing rollers, which are designated 4, are mounted in the bar 3, to be precise in ball bearings 5 on a shaft 6, which is retained in the bar 3 on both sides. In the exemplary embodiment, a total of 18 load-bearing rollers 4 are arranged in the bar 3, the latter being terminated by two toothed rollers 7 and 8, of which the roller 7 belongs to a drive station 9 comprising the motor 10, the gear mechanism 11, the drive chain 12 and the driving gearwheel 7. This drive station 9 can be seen schematically in the plan view. A load-bearing belt 21, which will be described in more detail at a later stage in the text, is guided over the load-bearing rollers and the two toothed rollers 7 and 8.

Figure 2:
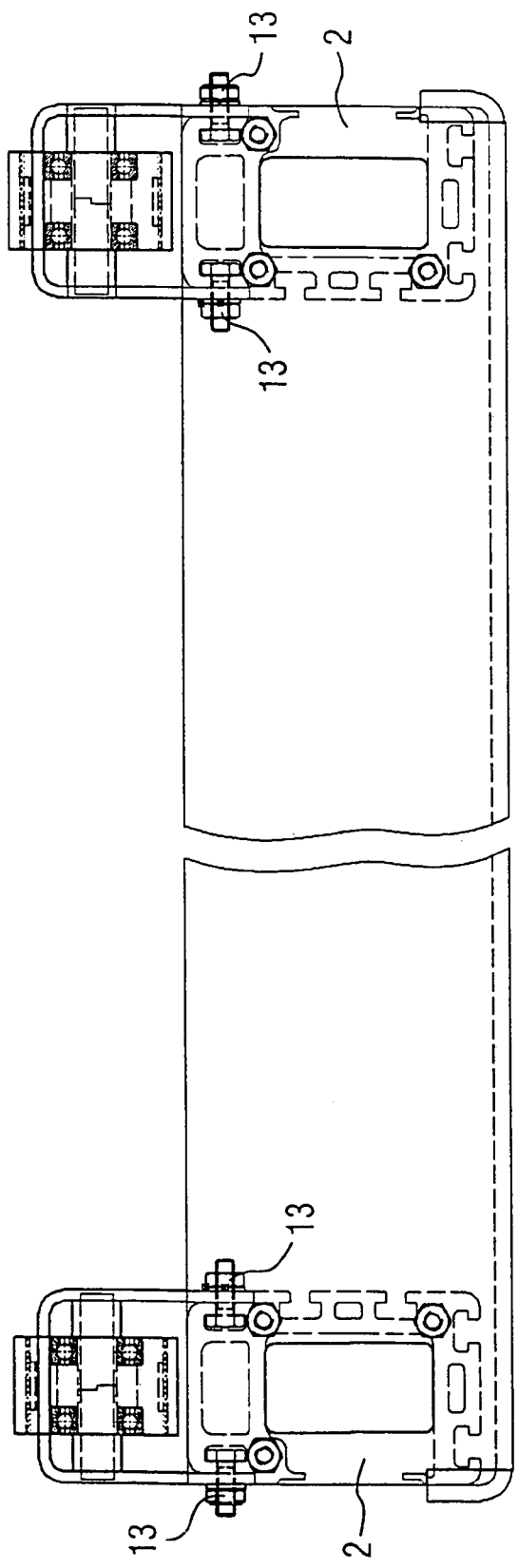
FIG. 2 shows a cross section through a conveyor unit according to the invention.

A cross section through the conveyor unit is illustrated schematically in FIG. 2; it can be seen that each load-bearing profile 2 comprises a C-shaped extruded profile, on which the U-shaped bar 3 is positioned, the "U" being upside down, with the result that the opening of the U-shaped profile is oriented downward. The two load-bearing profiles 2 and the two bars 3 are of identical configuration, the bar 3 and the load-bearing profile 2 being screw-connected via hammer head screws 13 which are inserted into T-grooves of the aluminum load-bearing profile 2 and pass through bores in the legs of the U-shaped bar 3.

Figure 3:
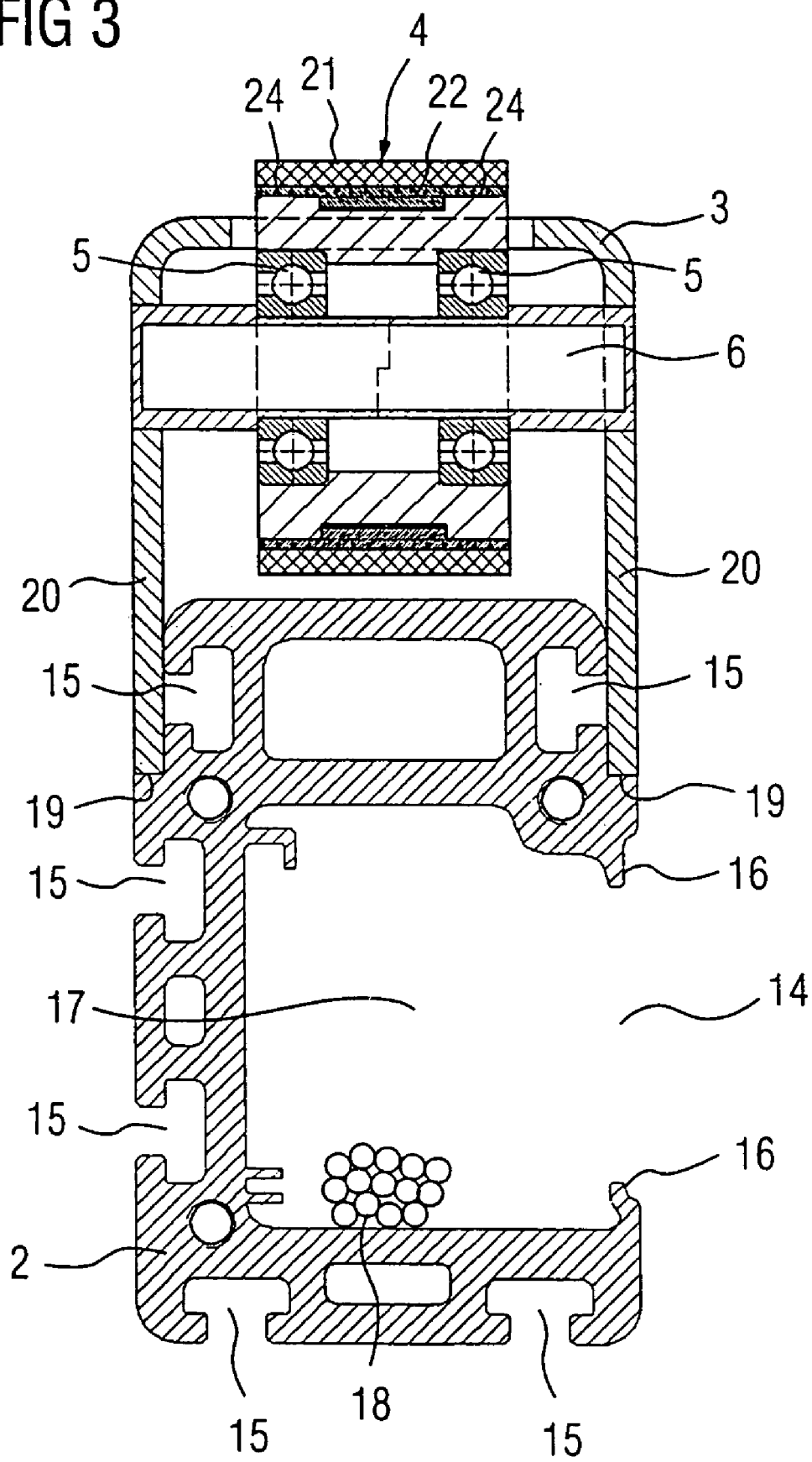
FIG. 3 shows an enlarged cross section through the load-bearing member of a conveyor unit in the region of the load-bearing roller.

A cross section through the load-bearing profile 2 is illustrated on an enlarged scale in FIG. 3. It can clearly be seen here that the load-bearing profile 2 is of cross-sectionally C-shaped configuration with an opening 14 which is oriented to the right, and that the load-bearing profile 2 is provided with a plurality of T-grooves 15 which run in the longitudinal direction and serve for fastening add-on parts. Furthermore, as can be seen on the right-hand side of the C-shaped load-bearing profile, the opening region 14 is provided with set-back portions 16 in the load-bearing profile 2, these forming a rest for a closure plate (not illustrated) which can be used to close the opening 14 of the load-bearing profile 2. The cavity 17, which is formed in the load-bearing profile 2, is suitable for accommodating cable harnesses 18, control parts, initiators or the like, with the result that these parts can be installed in an easily reachable manner and, if required, are easily accessible, possibly with the covering having been removed beforehand.

A shoulder 19 is formed in the top region of the load-bearing profile 2, on both sides in each case, and serves as a rest for the U-shaped bar 3, it being possible for the latter to be positioned there by way of its legs 20 on the end side. Fastening takes place, by means of hammer head screws 13 (illustrated in FIG. 2), via the T-grooves 15, over which the legs 20 of the U-shaped bar 3 grip. The U-shaped bar 3 itself accommodates, in the two legs 20, the spindles 6 for the load-bearing rollers 4, the latter being mounted on these spindles 6 by means of ball bearings 5. The load-bearing belt 21, which is designed as a toothed belt, can be seen on the load-bearing roller 4 in FIG. 3, the toothing formation 22, provided in crosspiece form in the central region, of this load-bearing belt being accommodated in depressions or peripheral cutouts 23 of the load-bearing rollers 4, with the result that the smooth undersides 24 of the load-bearing belt 21, these being formed on both sides of the toothing formation, can be borne on the smooth surface of the load-bearing rollers 4. The configuration of the load-bearing belt 21 will be described in more detail at a later stage in the text.

Figure 4:
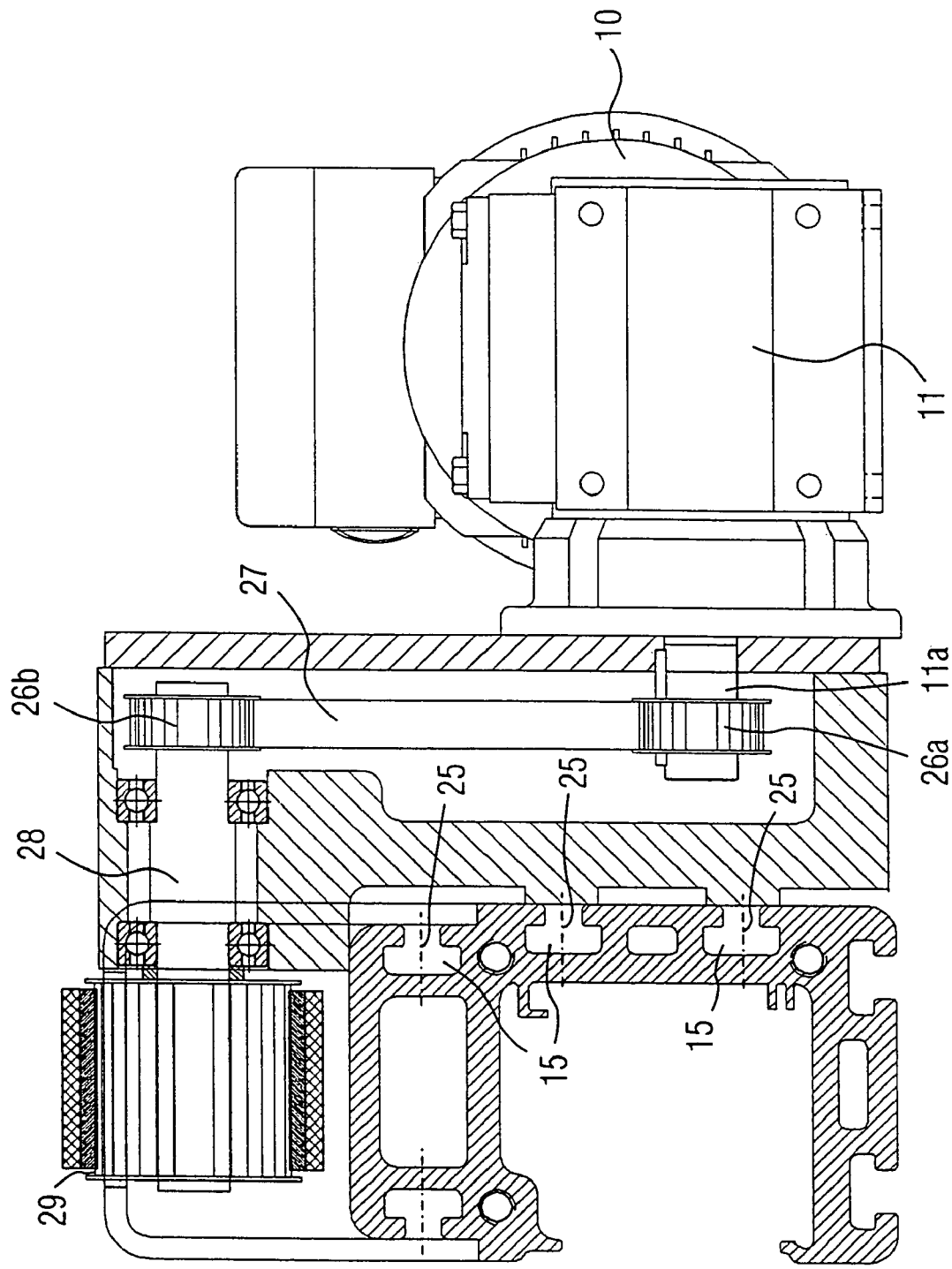
FIG. 4 shows an enlarged cross section through the load-bearing member of a conveyor unit in the region of the drive station.

FIG. 4 gives an enlarged illustration of a section through the drive station 9, which is fastened by means of hammer head screws (not illustrated) at 25, likewise at the T-grooves 15 in the load-bearing profile 2. The drive station 9 comprises the motor 10, the gear mechanism 11 and a gear-mechanism output 11a with a chain wheel 26a, which is connected, via a chain 27, to the chain wheel 26b, which is fastened on the shaft 28 of the driving gear wheel 7, which is mounted in a floating manner. The last-described components are arranged in a housing 29, which is flanged to the load-bearing profile 2 such that the driving gear wheel 7, which is mounted in a floating manner, overlaps the load-bearing profile 2 and is fixed in a position in which the driving gearwheel 7 is arranged in front of the bar 3 on the head side. The vertical alignment of the driving gearwheel 7 is selected such that the top 29 of the driving gearwheel 7 is located in the load-bearing plane of the load-bearing rollers 4, with the result that the driving gearwheel 7, at the same time, performs the function of a load-bearing roller 4. The same applies to the deflecting gearwheel 8 at the opposite end of the bar 3.

The floating arrangement of the driving gearwheel 7 allows a damaged or worn load-bearing belt 21 to be removed once the drive station 9 and the bar 3 have been removed, without high-outlay dismantling being required. Since the driving gearwheel 7 is part of the drive station 9, which is connected to the load-bearing profile 2 but is not part of the bar 3, which accommodates the load-bearing rollers 4, it is possible, by virtue of the fastening screws 13 in the T-grooves 15 being released, to displace the bar 3 in the longitudinal direction of the load-bearing profile 2 and thus to tension the load-bearing belt 21 around the driving gearwheel 7 and the deflecting gearwheel 8, mounted at the end of the bar 3.

FIG. 5 gives a schematic illustration of a longitudinal section through part of the load-bearing belt 21. Visible on the top side of the load-bearing belt 21 are cleat-like profilings 30, which serve for increasing the traction of the load-bearing belt 21. The profilings 30 may consist of a material with a high coefficient of friction, for example of rubber. As can be seen from the dashed lines 31 in the longitudinal direction of the load-bearing belt 21, the latter is intended to be reinforced by a means which increases tensile force, for example stranded wires are incorporated in the load-bearing belt by vulcanization. Visible on the underside of the load-bearing belt 21 are the toothing formations 32, which are necessary for applying the driving power to the load-bearing belt 21 and engage in a form-fitting manner in the corresponding toothing formations of the driving gearwheel 7.

As shown in the alternatives of FIG. 6, these being plan views of the top sides of the load-bearing belt 21, the profilings 30 of the surface of the load-bearing belt 21 can be configured in different ways, for example transverse cleats running simply at right angles to the transporting direction (top illustration) are conceivable, as are arrow profiles (central illustration) or, as is shown in the bottom illustration, profiles which are configured in the manner of a vehicle-tire profile.

FIG. 7 shows that it is also possible for the toothing formation 22 on the underside of the load-bearing belt 21 to be configured in different ways, for example it is conceivable to provide a central crosspiece-like tooth region (top illustration) alongside which are formed on both sides the smooth regions 24 which can be borne on the load-bearing rollers 4. A variant can be seen in the central illustration. Here, smooth regions 24 have been applied by vulcanization, these making it possible for the load-bearing rollers 4 to be of smoothly cylindrical configuration. In the bottom illustration, the toothing formation 22 is divided and arranged on both sides of the center longitudinal axis of the load-bearing belt 21; in this case, the action of the load-bearing belt 21 being borne on the load-bearing rollers 4 can take place in the central, toothing-free region of the load-bearing belt 21.

Figure 8:
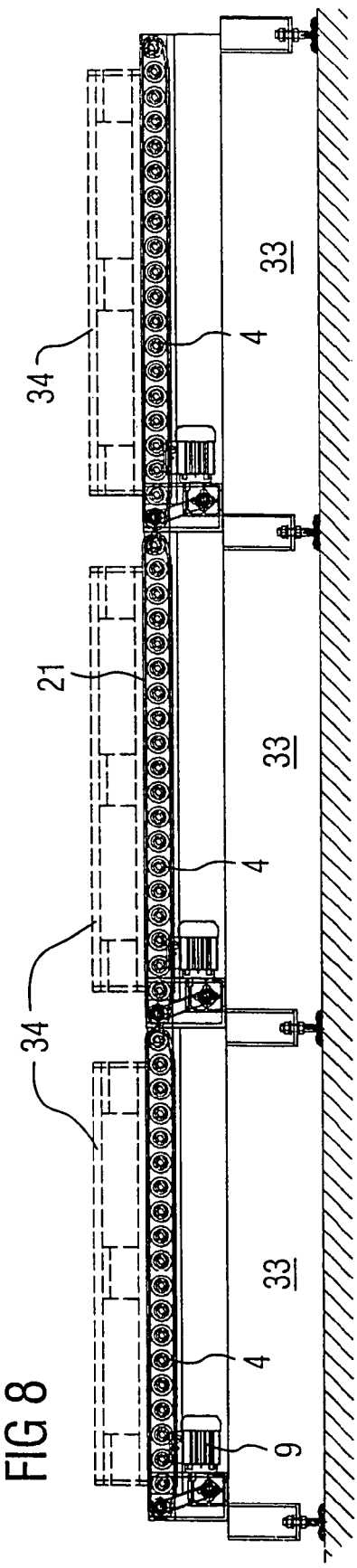
FIG. 8 shows the side view of a conveyor made up of modular conveying units.

FIG. 8 illustrates how three conveyor units 33 of the invention are put together to form a conveyor. Each conveyor unit 33 is of completely autonomous design and, alongside the load-bearing rollers 4 in the bars 3 with the circulating load-bearing belt 21, contains dedicated drive stations 9. All the conveyor units 33 are of the same construction, their length corresponding approximately to the length of a DIN pallet, which is indicated on the conveyor by chain-dotted lines at 34.

Figure 10:
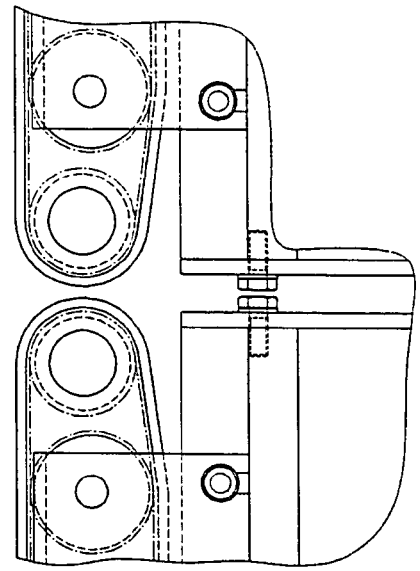
FIG. 10 shows an enlarged illustration of the connection between two adjacent conveyor units.
Figure 9:
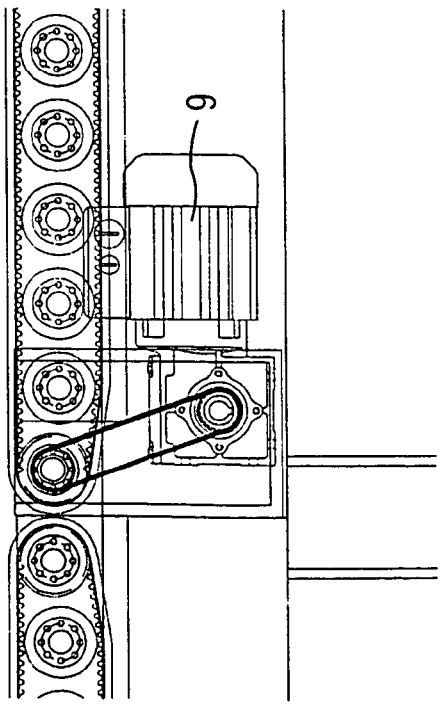
FIG. 9 shows an enlarged illustration of the interface between two adjacent conveying units of the same construction with a drive.

FIG. 9 shows in an enlarged illustration, in detail form, how two conveyor units 33 of a conveyor can be set up one beside the other to form a common conveying plane. FIG. 10 shows that the two conveyor units can be screwed to one another in order to form the common conveyor.

It is advantageously possible for the conveyor units 33 to be transported in preassembled form from the factory to the set-up location, in which case the short overall length is advantageous. At the set-up location, all that is then required is for the conveyor units 33 to be screwed together and for the plug-cable connection to be connected, the conveyor being ready for use once the operating current has been switched on.

FIG. 11 shows a cross section through a conveyor unit 33 with three load-bearing tracks 35a, 35b and 35c, of which each load-bearing track can be driven by a separate drive station 9. The drive stations 9 are linked to one another via an electronic shaft, this ensuring that the three load-bearing belts 21 of the load-bearing tracks 35a, 35b and 35c are synchronized. By corresponding control of the outer drive stations 9, it is possible to establish differences in speed during circulation of the load-bearing belts 21 of the load-bearing tracks 35a and 35b with the aim of straightening up skewed load carriers 34 in accordance with the principle of steering a crawler-type tracked vehicle.

FIG. 13 shows, once again, an enlarged plan view of one of the identically constructed drive stations 9; the motor 10, the gear mechanism 11 and the driving gearwheel 7, which is mounted in a floating manner, can also be seen here.

Figure 14:
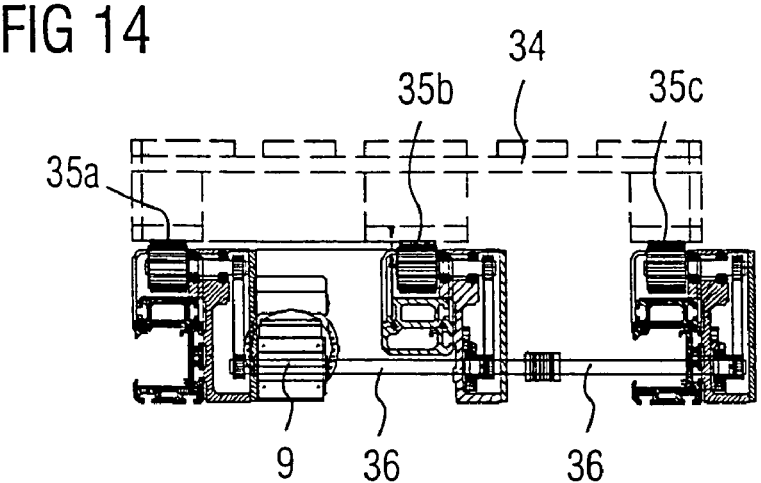
FIG. 14 shows the cross section through a conveyor unit according to the invention in the region of the drive station with mechanical shaft.

FIG. 14 illustrates a cross section of another conveyor unit 33, in which three load-bearing tracks 35a, 35b and 35c are likewise provided. In this example, just a single drive station 9 with a more powerful motor 10 is provided, this motor driving all three load-bearing belts 21 of the load-bearing tracks 35a, 35b and 35c synchronously via a mechanical shaft 36.

Figure 15:
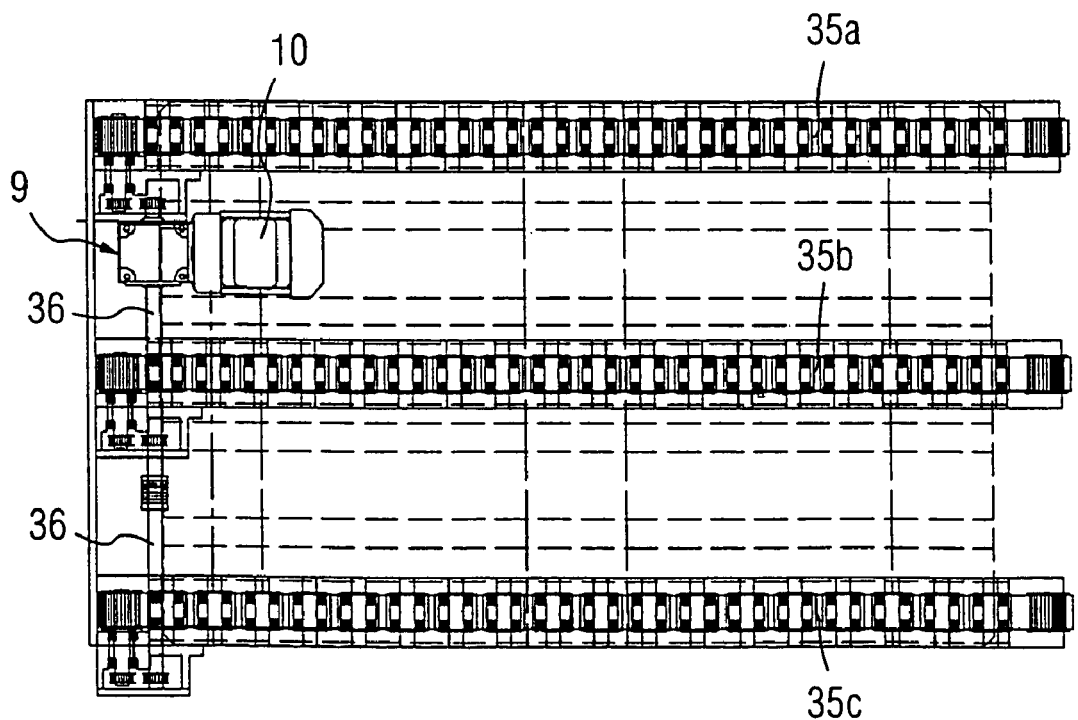
FIG. 15 shows a plan view of the conveyor unit according to FIG. 14.

FIG. 15 shows a plan view of the conveyor unit 33 according to FIG. 14, like parts being provided with like designations.

Changes and modifications to the specifically described embodiments may be carried out without departing from the principles of the present invention, which is intended to be limited only by the scope of the appended claims, as interpreted according to the principles of patent law.

What is claimed is:

1. A conveyor for transporting load carriers, in particular standardized pallets, skids or containers, said conveyor comprising:

frame parts which stand on the floor and on which are arranged load-bearing members which are spaced apart parallel to one another and are intended for accommodating drivable load-bearing elements which form longitudinally running load-bearing tracks for the load carriers on the load-bearing elements; and modular-construction conveying units, said conveying units being at least one of mechanically connected and electrically connected so that said conveying units are joined as a functional conveyor assembly, each load-bearing element of at least two laterally spaced-apart load-bearing members of each conveyor unit comprising an endlessly circulating load-bearing belt, said load bearing bell bearing the load carriers and being supported on a plurality of spaced apart load-bearing rollers, which are mounted on the load-bearing members, with a gap between respective adjacent pairs of said rollers, and which circulate in the conveying direction, said gap between said rollers being less than the dimension of a diameter of one of said rollers, each load-bearing member comprising a load-bearing profile and a bar, which is positioned in an exchangeable manner on the load-bearing profile and in which the load-bearing rollers for the load-bearing belt are mounted, the load-bearing profile being open at least on one of its longitudinal sides, characterized in that the load-bearing profile of each load-bearing member is cross-sectionally C-shaped and the bar, which can be positioned on the load-bearing profile, is cross-sectionally U-shaped, the load-bearing rollers for the load-bearing belt being mounted in the legs of the U-shaped profile of the bar.

2. The conveyors as claimed in claim 1, characterized in that the load-bearing belts comprise toothed belts, of which the teeth arranged on the underside, for the purpose of transmitting the driving torque, engage in the correspondingly designed teeth of at least one driving gearwheel.

3. The conveyor as claimed in claim 1, characterized in that the load-bearing members are formed from a rolled steel profile or angled sheet metal.

4. The conveyor as claimed in claim 1, characterized in that the load-bearing members are formed from an extruded aluminum profile.

5. The conveyor as claimed in claim 1, characterized in that the U-shaped bar is positioned on the load-bearing profile, and screwed to the latter, with the opening in the downward direction, and the load-bearing rollers have their running surfaces for the load-bearing belt projecting upward through cutouts provided in the bar.

6. The conveyor as claimed in claim 1, characterized in that the load-bearing profile of each load-bearing member is provided with T-grooves which run in the longitudinal direction and are provided for fastening at least one of frame parts, drive parts, initiators, control means and the U-shaped bar to said load-bearing member.

7. The conveyor as claimed in claim 6, characterized in that in each case at least two load-bearing members are joined together with the frame parts and supporting feet to form one of a number of autonomous conveyor units of the same construction, in which are integrated in each case at least one drive and control elements for the load-bearing elements of this one conveyor unit, said at least one drive and control elements of said one conveyor unit being linked for control purposes to further drives and control means of other conveyor units.

8. The conveyor as claimed in claim 1, characterized in that in each case at least two load-bearing members are joined together with the frame parts and supporting feet to form one of a number of autonomous conveyor units of the same construction, in which are integrated in each case at least one drive and control elements for the load-bearing elements of this one conveyor unit, said at least one drive and control elements of said one conveyor unit being linked for control purposes to further drives and control means of other conveyor units.

9. The conveyor as claimed in claim 8, characterized in that accelerating and braking processes of said conveyor units between preceding and following conveyor units are synchronized.

10. The conveyor as claimed in claim 8, characterized in that each autonomous conveyor unit is larger, in respect of its length and width measurements, than the dimensions of an individual load carrier which is to be transported.

11. The conveyor as claimed in claim 1, characterized in that, in order to form three load-bearing tracks, each conveyor unit contains three loading-bearing members with load-bearing elements, of which at least the two outer load-bearing elements have load-bearing belts supported on load-bearing rollers.

12. The conveyor as claimed in claim 1, characterized in that each load-bearing element is assigned a dedicated drive station with motor, and the motors of all the drive stations of a conveyor unit are synchronized with one another via an electronic shaft.

13. The conveyor as claimed in claim 1, characterized in that at least two load-bearing elements of a conveyor unit are each assigned a dedicated drive station with motor, and the drive stations are activated differently in order to achieve a differential speed for the load-bearing elements.

14. The conveyor as claimed in claim 1, characterized in that at least two load-bearing elements of a conveyor unit are driven via a common motor, and the driving wheels of the load-bearing elements are connected to one another via a mechanical shaft.

15. The conveyors as claimed in claim 1, characterized in that the load-bearing belt comprises a toothed belt, said load-bearing belt having on its underside, alongside regions which are toothed in order to drive the load-bearing belt, smooth regions which rest on the load-bearing rollers in order to hear the load resting on the load-bearing belt.

16. The conveyor as claimed in claim 15, characterized in that the toothed region is provided with a toothing formation having a plurality of generally straight teeth extending Laterally across said belt.

17. The conveyor as claimed in claim 15, characterized in that the toothed region is provided with a toothing formation in which the tooth widths are larger than the tooth gaps.

18. The conveyor as claimed in claim 1, characterized in that the load-bearing belt is provided with reinforcements which increase the tensile strength.

19. The conveyor as claimed in claim 18, characterized in that the reinforcements consist of embedded steel wire, Kevlar material or woven fabric made of such materials or other tension-resistant materials.

20. The conveyor as claimed in claim 18, characterized in that the load-bearing belt is provided with a traction-increasing top side.

21. The conveyor as claimed in claim 20, characterized in that the top side of the load-bearing belt is provided with a profile in the manner of a vehicle tire having a plurality of ribs that extend at different angles across said belt.

22. The conveyor as claimed in claim 21, characterized in that the profile is configured such that the traction is higher in the longitudinal direction and lower in the transverse direction.

23. The conveyor as claimed in claim 21, characterized in that the profile is designed to be arrow-shaped, half-moon-shaped or interrupted or rectilinear throughout.

24. The conveyor as claimed in claim 1, characterized in that at least one of die load-bearing rollers and the driving gearwheels are designed with flanged wheels for guiding at least one of the load-bearing belt and the load carder.

25. The conveyor as claimed in claim 1, characterized in that the modular-constructed conveying units, completely preassembled and subjected to final testing, are assembled together to form the conveyor at the use location.

26. The conveyor as claimed in claim 1, characterized in that the load-bearing members of the conveyor units are connected to one another at their mutually facing ends via metal plates with fastening bores provided at unit spacings.

27. A conveyor for transporting load carriers, in particular standardized pallets, skids or containers, said conveyor comprising:
frame parts which stand on the floor and on which are arranged load-bearing members which are spaced apart parallel to one another and are intended for accommodating drivable load-bearing elements which form longitudinally running load-bearing tracks for the load carriers on the load-bearing elements; and
modular-construction conveying units, said conveying units being at least one or mechanically connected and electrically connected so that said conveying units are joined as a functional conveyor assembly, each load-bearing element of at least two laterally spaced-apart load-bearing members of each conveyor unit comprising an endlessly circulating load-bearing belt, said load bearing belt bearing the load carriers and being supported on a plurality of spaced apart load-bearing rollers, which are mounted on the load-bearing members, with a gap between respective adjacent pairs of said rollers, and which circulate in the conveying direction, said gap between said rollers being less than the dimension of a diameter of one of said rollers, each load-bearing member comprising a load-bearing profile and a bar, which is positioned in an exchangeable manner on the load-bearing profile and in which the load-bearing rollers for the load-bearing belt are mounted, the load-bearing profile being open at least on one of its longitudinal sides, characterized in that the load-bearing profile of each load-bearing member is cross-sectionally C-shaped, and fastened on the load-bearing profile are two vertical metal plates which are spaced apart parallel to one another in the longitudinal direction and between which the load-bearing rollers for the load-bearing belts are mounted.

28. The conveyor as claimed in claim 27, characterized in that at least one of the C-shaped load-bearing profiles of the load-bearing members is installed on the frame parts with the opening in the outward direction and the cavity within the C-shaped load-bearing profile, said cavity being closed by a covering plate, said at least one C-shaped load-bearing profile of the load-bearing members being configured as a cable duct and/or for accommodating electrical or electronic components.

29. A conveyor for transporting load carriers, in particular standardized pallets, skids or containers, said conveyor comprising:
frame parts which stand on the floor and on which are arranged load-bearing members which are spaced apart parallel to one another and are intended for accommodating drivable load-bearing elements which form longitudinally running load-bearing racks for the load carriers on the load-bearing elements; and
modular-construction conveying units, said conveying units being at least one of mechanically connected and electrically connected so that said conveying units are joined as a functional conveyor assembly, each load-bearing element of at least two laterally spaced-apart load-bearing members of each conveyor unit comprising an endlessly circulating load-bearing belt, said load bearing belt bearing the load carriers and being supported on a plurality of spaced apart load-bearing rollers, which are mounted on the load-bearing members, with a gap between respective adjacent pairs of said rollers, and which circulate in the conveying direction, said gap between said rollers being less than the dimension of a diameter of one of said rollers, in order to form three load-bearing tracks, each conveyor unit contains three loading-bearing members with load-bearing elements, of which at least the two outer load-bearing elements have load-bearing, belts supported on load-bearing rollers characterized in that, of three load-beating tracks, only the load-bearing elements of the central load-bearing track are driven.

30. The conveyor as claimed in claim 29, characterized in that each load-bearing member comprises a load-bearing profile and a bar, which is positioned in an exchangeable manner on the load-bearing profile and in which the load-bearing rollers for the load-bearing belt are mounted, wherein the bars, in which the load-bearing rollers for the load-bearing belt are mounted, and the load-bearing profiles are adjustable to vary the length of the conveying units.

31. The conveyor as claimed in claim 29, characterized in that each load-bearing member comprises a load-bearing profile and a bar.

32. The conveyor as claimed in claim 31, characterized in that the load-bearing profile is open at least on one of its longitudinal sides.

33. The conveyor as claimed in claim 32, characterized in that the load-bearing profile of each load-bearing member is cross-sectionally C-shaped and the bar, which can be positioned on the load-bearing profile, is cross-sectionally U-shaped, the load-bearing rollers for the load-bearing belt being mounted in the legs of the U-shaped profile of the bar.

34. The conveyor as claimed in claim 33, characterized in that the bar is positioned in an exchangeable manner on the load-bearing profile and in which the load-bearing rollers for the load-bearing belt are mounted, wherein the metal plates are cut out at the C-shaped openings of the load-bearing members.

35. The conveyor as claimed in claim 29, characterized in that each load-bearing member comprises a load-bearing profile and a bar, which is positioned in an exchangeable manner on the load-bearing profile and in which the load-bearing rollers for the load-bearing belt are mounted.

36. The conveyor as claimed in claim 35, characterized in that the load-bearing profile is open at least on one or its longitudinal sides.

37. A conveyor for transporting load carriers, in particular standardized pallets, skids or containers, said conveyor comprising:
frame parts which stand on the floor and on which are arranged load-bearing members which are spaced apart parallel to one another and are intended for accommodating drivable load-bearing elements which form longitudinally running load-bearing tracks for the load carriers on the load-bearing elements; and
modular-construction conveying units, said conveying units being at least one of mechanically connected and electrically connected so that said conveying units are joined as a functional conveyor assembly, each load-bearing element of at least two laterally spaced-apart load-bearing members of each conveyor unit comprising an endlessly circulating load-bearing belt, said load bearing belt bearing the load carriers and being supported a plurality of spaced apart load-bearing rollers, which are mounted on the load-bearing members, with a gap between respective adjacent pairs of said rollers, and which circulate in the conveying direction, said gap between said rollers being less than the dimension of a diameter of one of said rollers, characterized in that the drive for a load-bearing element comprises a prefabricated drive station which is screwed onto the load-bearing profile in the end region and has an integrated motor, gear mechanism and drive chain or belt and a driving gearwheel, which is mounted in a floating manner, about which the load-beating belt is deflected, and the top of which is arranged in the loud-bearing plane of the load-bearing rollers.

38. The conveyor as claimed in claim 37, characterized in that the motor and the gear mechanism are flanged directly onto the driving gearwheel, which is mounted in a floating manner.

39. The conveyor as claimed in claim 37, characterized in that the driving wheel is larger than the load-bearing rollers, and a smaller-diameter guard roller is arranged between the driving gearwheel and at least one of the directly adjacent load-bearing roller and the driving or deflecting wheel of the adjacent conveyor unit.

40. The conveyor as claimed in claim 39, characterized in that each load-bearing member is made up of a load-bearing profile and a bar, which is positioned in an exchangeable manner on the load-bearing profile and in which the load-bearing rollers for the load-bearing belt are mounted, wherein the load-bearing bolt can be tensioned by displacement of the bar relative to the driving gearwheel.

41. The conveyor as claimed in claim 39, characterized in that the load-bearing belt is tensioned by a tensioning roller provided in the bottom strand.

* * * * *

UNITED STATES PATENT AND TRADEMARK OFFICE
CERTIFICATE OF CORRECTION

PATENT NO. : 6,957,736 B2 Page 1 of 1
APPLICATION NO. : 10/827175
DATED : October 25, 2005
INVENTOR(S) : Edgar Bonifer et al.

It is certified that error appears in the above-identified patent and that said Letters Patent is hereby corrected as shown below:

Column 12:
Line 26, Claim 1, "bell" should be --belt--.

Column 13:
Line 50, Claim 15, "conveyors" should be --conveyor--.
Line 55, Claim 15, "hear" should be --bear--.

Column 14:
Line 18, Claim 24, "die" should be --the--.
Line 20, Claim 24, "carder" should be --carrier--.
Line 39, Claim 27, "or" should be --of--.

Column 15:
Line 13, Claim 29, "racks" should be --tracks--.
Line 32, Claim 29, Delete "," after "load-bearing".
Line 33, Claim 29, Insert --,-- after "rollers".
Line 34, Claim 29, "load-beating" should be --load-bearing--.

Column 16:
Line 7, Claim 36, "or" should be --of--.
Line 26, Claim 37, Insert --on-- before "a".
Line 37, Claim 37, "load-beating" should be --load-bearing--.
Line 38, Claim 37, "loud-bearing" should be --load-bearing--.
Line 55, Claim 40, "bolt" should be --belt--.

Signed and Sealed this

Eighth Day of April, 2008

JON W. DUDAS
*Director of the United States Patent and Trademark Office*